United States Patent
Iriya et al.

(10) Patent No.: US 7,226,655 B2
(45) Date of Patent: Jun. 5, 2007

(54) WRAP FILM

(75) Inventors: Masaru Iriya, Suzuka (JP); Yuichiro Sakamoto, Suzuka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/622,571

(22) Filed: Jul. 21, 2003

(65) Prior Publication Data

US 2004/0086667 A1    May 6, 2004

Related U.S. Application Data

(60) Provisional application No. 60/447,243, filed on Feb. 14, 2003.

(30) Foreign Application Priority Data

Jul. 26, 2002 (JP) .............................. 2002-218211

(51) Int. Cl.
- *B32B 27/32* (2006.01)
- *B32B 27/06* (2006.01)
- *B32B 27/36* (2006.01)

(52) U.S. Cl. ..................... 428/220; 428/480
(58) Field of Classification Search ................ 428/220, 428/480
See application file for complete search history.

(56) References Cited

U.S. PATENT DOCUMENTS

| 2,083,007 | A | * | 6/1937 | Delaney ...................... 106/270 |
| 4,022,635 | A | * | 5/1977 | Earing ......................... 106/280 |
| 6,660,211 | B2 | * | 12/2003 | Topolkaraev et al. ....... 264/444 |
| 2002/0102423 | A1 | * | 8/2002 | Shibata et al. .............. 428/516 |

FOREIGN PATENT DOCUMENTS

| EP | 1 029 890 A2 | 8/2000 |
| JP | 1-294429 A | 11/1989 |
| JP | 4335060 | 11/1992 |
| JP | 5-162747 A | 6/1993 |
| JP | 7-257660 A | 10/1995 |
| JP | 7257660 | 10/1995 |
| JP | 10-1143 A | 1/1998 |
| JP | 10-36650 A | 2/1998 |
| JP | 11-222528 A | 8/1999 |
| JP | 11-323113 A | 11/1999 |
| JP | 2000-26623 A | 1/2000 |
| JP | 2000-26624 A | 1/2000 |
| JP | 2000-26625 A | 1/2000 |
| JP | 2000-26626 A | 1/2000 |
| JP | 2000-37837 A | 2/2000 |
| JP | 2000-185381 A | 7/2000 |
| JP | 2000-302956 A | 10/2000 |
| JP | 2001-49098 A | 2/2001 |
| JP | 2001-59029 A | 3/2001 |
| JP | 2001-09671 A | 4/2001 |
| JP | 2001-106805 A | 4/2001 |
| JP | 2001-106806 A | 4/2001 |
| JP | 2001-347622 A | 12/2001 |
| JP | 2002-1890 A | 1/2002 |
| JP | 2002-59524 A | 2/2002 |
| JP | 2002-60604 A | 2/2002 |
| JP | 2002-60605 A | 2/2002 |
| JP | 2002-60606 A | 2/2002 |
| JP | 2002-80703 A | 3/2002 |

* cited by examiner

*Primary Examiner*—Michael C. Miggins
(74) *Attorney, Agent, or Firm*—Birch, Stewart, Kolasch & Birch, LLP

(57) ABSTRACT

A wrap film comprising a layer of resin composition (C) as at least one surface layer, wherein resin composition (C) comprises 100 parts by mass of an aliphatic polyester resin (A) and 5 to 40 parts by mass of a liquid additive (B), and having a surface roughness of 0.5 to 4.0 nm, a tensile modulus of 400 to 1500 MPa, a heat resistant temperature of 130° C. or more and cling energy of 0.5 to 2.5 mJ, and a wrap product having the wrap film placed in a box. There is provided an easy-to-use wrap film having cling property and pulling-out property.

7 Claims, No Drawings

WRAP FILM

CROSS REFERENCE TO RELATED APPLICATION

This application claims the benefit of U.S. Provisional application No. 60/447,243, filed on Feb. 14, 2003.

BACKGROUND OF THE INVENTION

1. Field of the Invention

The present invention relates to a wrap film suitable mainly for wrapping food and to a wrap product comprising the wrap film and a dispenser box having the wrap film placed therein. In particular, the present invention relates to a wrap film using aliphatic polyester resin, wherein the wrap film is easy to use in view of its improved clinging property and pulling-out property.

2. Related Art

Heretofore, a thin film made of thermoplastic resin has been used for food that must be stored or heated with a microwave in food-related businesses such as restaurants and food stores or at home. Among them, a wrap film of vinylidene chloride copolymer resin has multiple excellent properties such as resistance to damping, oxygen gas barrier property, heat resistance, clinging property to containers and transparency making it a popular item for use as a film for wrapping food. In addition, a wrap film made of polyethylene or polypropylene, which is a non-chloride resin, has been developed and marketed these days.

These wrap films demonstrate the necessary properties as a wrap film such as clinging property and gas barrier property by taking advantage of features of composed resins and composition of additives. Among these necessary properties, clinging property and pulling-out property from the state where a wrap film is wound around a paper core are the important properties which greatly influence its ease of use.

On the other hand, a wrap film made of aliphatic polyester such as polylactic acid resin, which is considered to be more harmless and has less of an environmental impact, has been proposed (for example, in JP-A-2000-26623, JP-A-2000-26624, JP-A-2000-26625, JP-A-2000-26626, JP-A-2000-37837, JP-A-2001-96701, JP-A-2001-106805, JP-A-2001-106806, JP-A-2000-185381, JP-A-2000-302956). All of these documents provide a wrap film having an excellent clinging property by using an aliphatic polyester resin such as polylactic acid resin. However, these documents do not teach how to control the pulling-out property so that the resultant film rolls are poor in balance of pulling-out property and clinging property and insufficient in ease of use.

Further, a flexible aliphatic polyester resin film that is not a wrap film is disclosed in JP-B-3105020, JP-B-3178692, JP-A-11-222528, JP-A-2001-49098, JP-A-2002-60605 and the like. However, none of the films proposed in these documents are intentionally given a clinging property and is therefore deficient in this property. In addition, none of them discloses information regarding the pulling-out property, and none seeks to improve the ease in use by considering both properties. JP-A-2002-60604 and JP-A-2002-60606 disclose films obtained by a non-stretching or an uniaxial stretching method. However, these films have insufficient ease of use owing to poor size stability when exposed to a high temperature such as heating in a microwave and poor cutting property, i.e., the film stretches and is cut in different directions from that which was intended when being cut with the blade of a dispenser box. Moreover, since the pulling-out property is not specifically considered and special means from the viewpoint of control of clinging property is not provided, the films sometimes deteriorate in the balance between clinging property and pulling-out property.

Furthermore, the technology for controlling surface roughness of a polylactic acid resin film is disclosed in JP-A-2001-592029. However, this document teaches that the surface roughness can be controlled by mixing inorganic particles having an average particle size of 0.1 to 5 µm so that the surface roughness is on a level of µm, which is greatly different from the range of surface roughness aimed in the present invention. In addition, the film obtained therein is not intended to have an improved clinging property so that the clinging property is insufficient.

As described above, there has been room left for further improvement in order to obtain an easy-to-use wrap film by using a resin considered biodegradable such as aliphatic polyester resin.

SUMMARY OF THE INVENTION

An object of this invention is to provide a wrap film which is easy-to-use having both a clinging property and a pulling-out property.

Another object of the invention is to provide a biodegradable easy-to-use wrap film having both a clinging property and a pulling-out property and wrap products.

The present inventors have conducted extensive research to solve the above-mentioned problems and accomplished the invention. Namely, the present invention is as follows:

(1) A wrap film comprising a layer of resin composition (C) as at least one surface layer, wherein resin composition (C) comprises 100 parts by mass of an aliphatic polyester resin (A) and 5 to 40 parts by mass of a liquid additive (B), and having a surface roughness of 0.5 to 4.0 nm, a tensile modulus of 400 to 1500 MPa, a heat resistant temperature of 130° C. or more and cling energy of 0.5 to 2.5 mJ.

(2) A wrap film roll comprising a core and the wrap film according to the above-described (1) wound around the core, wherein a pulling-out force of the wrap film from the core is 5 to 100 cN.

(3) The wrap film according to the above-described (1), wherein the aliphatic polyester resin (A) contains 90% by mass or more of polylactic acid resin comprising 8% by mass or less of D-body.

(4) The wrap film according to the above-described (1), wherein the liquid additive (B) contains 70% by mass or more of glycerin fatty acid ester.

(5) The wrap film according to the above-described (4), wherein the glycerin fatty acid ester is represented by the following formula (I).

Formula (I):

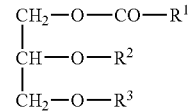

(wherein $R^1$ represents alkyl group, and $R^2$ and $R^3$ represents acetyl group or hydrogen.)

(6) A wrap product comprising a core, the wrap film according to any one of the above-mentioned (1) and (3)–(5) wound around the core and a box having the wrap film placed therein, wherein a cutter blade attached to the box is made of plant derivative-resin or paper.

(7) A wrap product comprising the wrap film roll according to the above-described (2) and a box having the wrap film roll placed therein, wherein a cutter blade attached to the box is made of plant derivative-resin or paper.

DETAILED DESCRIPTION OF THE INVENTION

Hereinafter, the present invention is illustrated in detail focusing on preferable embodiments.

One of differences between the present invention and the prior art is that the present invention pursues ease of use of a wrap film by balancing clinging property and pulling-out property; while the prior art does not pursue the ease of use of an aliphatic polyester resin film as a wrap film, or even if an aliphatic polyester resin film is intended to be used as a wrap film, the prior art only pursues improvement in clinging property and flexibility without considering the pulling-out property.

Namely, as a result of studies focusing on a balance between the clinging property and pulling-out property, the present inventors found the range where a wrap film using aliphatic polyester resin simultaneously achieves both properties with good balance and found that a composition of at least one of surface layers of a wrap film and strict control of the surface roughness of the film are important in achieving a clinging property and a pulling-out property in the range as described above.

Further, the inventors succeeded in providing a wrap film that is assumed to have biodegradability by using an aliphatic polyester resin, particularly polylactic acid resin, in consideration mainly for a good balance between the clinging property and the pulling-out property, and further of heat resistance, transparency, cutting property of film, goodness of feeling to the touch, property of following the shape of an object to be wrapped and the like.

In addition, examples of process conditions suitable for imparting to a film the properties as mentioned above include specific extrusion conditions of molten resins, a specific longitudinal and transverse stretching ratio condition and specific stretching temperature condition in the stretching zone, and specific heat treatment conditions such as heating temperature and heating time in the heat treatment zone. Among them, the specific heat treatment condition is important to prevent film blocking, which occurs when the glass transition temperature of the composition is decreased by addition of plasticizer, and to obtain the necessary range of the surface roughness of the present invention, which is described below. If the blocking occurs, it is difficult to pull out the film from wound-up film. In the prior art, it is proposed to add a blocking inhibitor or crystal nucleating agent of inorganic powder to prevent blocking. However, this method tends to deteriorate the clinging property of the film owing to the blocking inhibitors or crystal nucleating agent existing on the film surface, and thus it is not always effective. In the present invention, it is preferred to conduct the heat treatment described below under the specific conditions without adding either the blocking inhibitor or crystal nucleating agent.

The film of the present invention comprises a layer of resin composition (C) comprising 100 parts by mass of aliphatic polyester resin (A) and 5 to 40 parts by mass of liquid additive (B).

Examples of the aliphatic polyester resin (A) used in the present invention include polymers obtained by polymerizing one or more than one kind of lactic acid, glycol acid, 3-hydroxy butyric acid, 2-hydroxy-2,2'-dialkyl acetic acid including 2-hydroxy iso-butyric acid, 3-hydroxy valeric acid, and hydroxy carboxylic acid such as 4-hydroxy butane acid and 3-hydroxy hexane acid; and copolymer of these polymers and other monomer. There is no particular limitation on polymerization method, co-polymerization ratio and structure. Further, two or more kinds of these polymers may be blended and used as far as the object of the present invention is not deviated. From the viewpoint of heat resistance and transparency, the aliphatic polyester resin is preferably lactic acid type aliphatic polyester such as polylactic acid resin that is the polymer of lactic acid, particularly preferably aliphatic polyester resin comprising 90% by mass of polylactic resin based on the whole aliphatic polyester resin.

Since the monomer to be polymerized contains optical isomers such as L-body, D-body and DL-body, polylactic acid resin in the form of polymer varies according to the differences of composition ratio of L-body and D-body, the bonding order and structure. The biggest difference in the properties of the polymers is crystalline property. The crystalline property depends on the content of D-body in the case of the polymer in which L-body dominates and the content of L-body in the case of the polymer in which D-body dominates. In the present invention, crystalline polylactic acid resin is preferably used to secure the heat resistance described below. For that purpose, it is more preferred, for example, that the content of D-body (repeating units derived from D-body) in the polymer in which L-body dominates is 8% by mass or less. Herein, the content of D-body is a value measured by HPLC analysis method (high speed liquid chromatography method). Examples of the polylactic acid resin include, for example, "Natureworks" (trade name) series, manufactured and sold by Cargill Dow LLC.

The aliphatic polyester resin (A) has preferably a melting point of 130° C. or more from the viewpoint of heat resistance of the film. Herein, the melting point is defined by crystalline melting peak temperature according to the DSC (differential scanning calorimetry) method. Although the maximum melting point is not particularly limited, it is preferably 230° C. or less in general. Further, aliphatic polyester resin (A) is preferably crystalline from the viewpoint of heat resistance and dimensional stability at high temperature of film, and restraint of change in properties with time after film forming.

The content of aliphatic polyester resin (A) in the layer of resin composition (C) is preferably 60 to 95% by mass, more preferably 70 to 91% by mass from the viewpoint of heat resistance, balance of the clinging property and the pulling-out property and the dimensional stability at high temperature of the resultant film, and restraint of blocking after film forming.

In the film of the present invention, the layer of resin composition (C) comprises liquid additive (B). The liquid additive (B) is added in the present invention mainly for improving clinging property and flexibility of the film and for controlling the pulling-out force. Since the film consisting of aliphatic polyester resin (A) is insufficient in clinging property, the improvement of clinging property is particularly important.

The liquid additive (B) means an additive which is liquidized at 45° C. or less. The liquid additive (B) can be properly selected from the known additives as far as the object of the present invention is not deteriorated (e.g., transparency or heat resistance is not remarkably ruined). However, when considering the film to use for food wrapping, additives such as food additives like glycerin fatty acid ester and polybutene and indirect food additives admitted to contact food like epoxy plant oil and acetylated citric acid fatty acid ester are preferred. In addition, a biodegradable additive is more preferably used since the aliphatic polyester resin (A) is considered biodegradable. These additives may be used alone or in combination as far as the object of the present invention is not deteriorated.

Among the above-described liquid additive (B), glycerin fatty acid ester is most preferred from the viewpoint of clinging property and pulling-out property of the wrap film. Although there is no particular limitation on glycerin fatty acid ester, polyglycerin fatty acid ester such as diglycerin, triglycerin and tetraglycerin can be exemplified in addition to monoglyceride, diglyceride, triglyceride and acetylated monoglyceride. Among them, acetylated monoglyceride is particularly preferably selected from the viewpoint of good compatibility with aliphatic polyester resin and high plasticizability.

This acetylated monoglyceride has a molecular structure as shown in the following formula (I):

Formula (I):

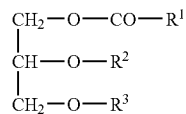

In the above formula (I), $R^1$ represents alkyl group, and $R^2$ and $R^3$ each represents acetyl group or hydrogen. The number of carbon atoms of these alkyl groups is not particularly limited and is properly selected so as to achieve the object of improving the clinging property and flexibility. In general, the number is preferably 6 to 20.

The liquid additive (B) preferably comprises 70% by mass or more of glycerin fatty acid ester. Namely, the total mass of glycerin fatty acid ester in the layer of resin composition (C) is preferably 70% or more in relative to the total mass of liquid additive (B) from the viewpoint of compatibility with aliphatic polyester resin and transparency of the wrap film.

The content of the liquid additive (B) in the layer of resin composition (C) is 5 to 40 parts by mass, preferably 10 to 35 parts by mass, based on 100 parts by mass of the aliphatic polyester resin (A) from the viewpoint of the clinging property and the pulling-out property of the film.

Other known additive or resin may be mixed to the layer of resin composition (C) in addition to the aliphatic polyester resin (A) and the liquid additive (B). However, for the reason that existence of a material that is extruded without being melted at the extrusion step, e.g., inorganic powder, on the surface of the film may result in deterioration of clinging property and surface smoothness of the film, the content of such inorganic powder is preferably 2.0 parts by mass or less, more preferably 1.5 parts by mass or less, furthermore preferably 0.5 parts by mass or less based on 100 parts by mass of the aliphatic polyester resin, and most preferably no inorganic powders are contained therein.

The layer of resin composition (C) preferably has a melting point of 130° C. or more from the viewpoint of heat resistance of the film. Herein, the melting point is determined by crystalline melting peak temperature according to the DSC method. Although the maximum melting point is not particularly limited, it is preferably 230° C. or less in general.

The surface roughness of the wrap film of the present invention is required, from the viewpoint of clinging property, to be 4 nm or less, and it is preferably 3.5 nm or less, more preferably 2.5 nm or less. The surface roughness of more than 4 nm makes the surface lack in smoothness, and influences the cling energy probably due to the deterioration of the interaction between the film surface and an article to be attached through a clinging substance such as liquid additive (B) so that the cling energy fails to fall in the range claimed in the present invention. Herein, the surface roughness is calculated from linear roughness measured on the face where an uneven image is observed with a view in 2 μm square of the film surface by using an atomic force microscope (generally abbreviated as AFM). The minimum surface roughness is 0.5 nm. No matter how the smoothness of a polymer film is improved, there substantially exists no film without an uneven part. Herein, the surface roughness of 0.5 nm is provided as a practical numerical value when a film is prepared by the process of the present invention.

The tensile modulus of the film of the present invention ranges 400 to 1500 MPa, preferably 500 to 1000 MPa. The tensile modulus is an index to flexibility of the film and stiffness at the time of handling the film, and is a physical value that influences clinging property, pulling-out property and cutting property. The tensile modulus of less than 400 MPa makes the film too soft and difficult to handle, and cutting property of the film. When the film is too soft, it is not easy to cut because it sticks to the blade or stretches instead of being perfectly cut. In addition, the pulling-out force of the film tends to increase when it is wound around a paper tube or the like. When the tensile modulus is more than 1500 MPa, the film becomes too hard so that it is poor in shape following property for an article to be wrapped and insufficient in the clinging property.

The film of the present invention has a heat resistant temperature of 130° C. or more, preferably 135° C. or more, which is measured by the method described below, from the viewpoint of ease of use in a microwave or the like. The maximum heat resistant temperature is automatically determined depending on aliphatic polyester resin used, liquid additive mixed thereto and layer structure. When the setting of the heat resistant temperature is too high, it results in damage of other properties such as shape following property for the article to be wrapped or clinging property and deterioration of feeling to the touch, which are caused by the film being too hard. Considering above, the maximum heat resistant temperature is preferably 230° C., more preferably around 220° C., in general.

The details of measurement of the clinging property will be described below, but, in brief, the clinging property is evaluated by a value referred to as cling energy (cling force) that is obtained from the energy necessary for peeling off the films sticking to each other on the surfaces thereof. The wrap film of the present invention has a cling energy of 0.5 to 2.5 mJ, preferably 0.7 to 2.2 mJ. When the cling energy is less than 0.5 mJ, sufficient clinging property to containers can not be obtained when wrapping. Therefore, there occur problems that the film peels off to expose food when food or the like is wrapped for storage. The cling energy of more than 2.5 mJ tends to make the pulling-out force large and the films tend to cling to each other and become wrinkled and crumpled before wrapping and are hard to recover the original shape owing to high cling energy. Since the clinging property means goodness of clinging and suitability of cling energy as a wrap film easy-to-use, when the cling energy is too high, the result is a poor clinging property.

The film of the present invention preferably has a pulling-out force within a predetermined range, which is measured by the method described below, when being wound around a core made of paper, the resin including a biodegradable resin or the like. Namely, the film of the present invention preferably has a pulling-out force of 5 cN or more for the reason that the film is difficult to rotate and unroll with a slight impact to fold and stick to each other in the dispenser box and the film is easy-to-use. The film of the present invention preferably has a pulling-out force of 100 cN or less for the reason that the film roll neither jumps out from the dispenser box during pulling out the film by hand nor contacts with the blade or the like to cause scratches in the film which causes a tear or split while jumping out. The more preferable range of the pulling-out force is 8 to 80 cN.

By setting the cling energy and pulling-out force in the specific range as described above, there can be obtained a film having excellent clinging property and simultaneously being easy-to-use, i.e., capable of being pulled out easily when wound around a paper tube or the like for use. As described above, excellent clinging property herein does not mean merely high cling energy but cling energy within an appropriate range, and excellent pulling-out property does not mean merely low pulling-out force but a pulling-out force within an appropriate range. When these properties deviate from the respective range, the ease of use of the film tends to be deteriorated as described above.

The present invention is a film having a layer of resin composition (C) placed as at least one of surface layers. Accordingly, the film of the present invention includes a monolayer film consisting only of layer of (C) and a multilayer film comprising layer of (C) and other layers.

In the case of a multilayer film, the layer of (C) may be used for both surface layers or for one surface layer. Further, layer construction may be either symmetric or asymmetric. In this case, the ratio of layer of (C) is preferably 20% or more based on the overall film thickness from the viewpoint of clinging property of the film. There are various other layers to be combined with the layer of (C) such as polylactic acid resin itself and aliphatic polyester resin incorporating the above-described liquid additive (B) or the known additives. From the viewpoint of biodegradability of the film, resin composition comprising aliphatic polyester resin as a main component is preferably used.

Considering ease of use of the wrap film, the total thickness of the film preferably ranges 5 to 15 μm. When the thickness is less than 5 μm, the film is sometimes torn when wrapping an angular article probably owing to insufficient strength of the film. In addition, when the thickness is more than 15 μm, the shape following property of the film to a complex-shaped article to be wrapped is deteriorated and the article cannot sometimes be wrapped well probably owing to too large of the thickness. Moreover, larger thickness of the film requires a larger amount of raw materials and unpreferably results in increase in product costs.

The wrap product of the present invention is that the above-described wrap film is wound around a core such as a paper tube and placed in a dispenser box. The blade attached to the box for cutting the film is preferably made of resin originated from plants such as starch and polylactic acid resin for the purpose of constructing the entire product by biodegradable materials. Examples of the resin originated from plants include starch resin using starches obtained from roots, leaves, stalks and fruits of plants and polylactic acid resin in addition to vegetables and fruits such as corn, sweet potatoes and potatoes. Moreover, blades made of paper may be used for the same purpose. Attaching these blades to a box made of paper provides a dispenser box entirely made of paper. As a result, it can be advantageously expected to omit separating step at the time of disposal, incineration or the like.

Next, preferable embodiments of production process of a wrap film and a wrap product of the present invention are described.

Upon forming the wrap film of the present invention, specific production conditions are preferably adopted together with specific composition for the purpose of achieving suitable ranges of clinging property, pulling-out property, heat resistance, surface roughness and flexibility. The specific conditions mainly relate to the range of setting conditions and operation in the extrusion molding step, stretching step and heat treatment step. In sum, it is preferred to select a film forming method which includes stretching, such as a flat stretching method wherein a monolayer or multilayer melt extruded sheet obtained by a T die production method is cooled and solidified using a cooling roll and then stretched by sequential biaxial stretching or simultaneous biaxial stretching to obtain a film; and a tubular stretching method wherein a tubular film extruded from a circular slit die is cooled and solidified by, for instance, air cooling or water cooling and then stretched multiaxially by forming a bubble to obtain a film. These film forming methods are preferred to film forming methods without a stretching step wherein no crystal growth occurs with stretching orientation, e.g., the method wherein a molten product extruded from T die is directly taken-up by a casting roll or the like to obtain a thin film, from the viewpoint of the cutting property or heat resistance of the resultant film.

In the present invention, it is preferred to feed aliphatic polyester resin (A) and liquid additive (B) separately lo to an extruder in the extrusion step comprising melting a raw material and mixing an additive thereto followed by cooling and molding. Therefore, an extruder used is preferably one equipped with an injection device for adding a liquid material to a molten resin, more preferably a twin screw extruder, furthermore preferably an intermeshing twin screw extruder. Herein, (A) and (B) are preferably mixed well uniformly from the viewpoint of cling energy, pulling-out force and surface roughness of the film obtained. Although it is possible to adopt a method wherein (A) and (B) are pelletized in a separate extruder or the like in advance and supplied to the extruder for molding, pellets are likely to slip on the screw in the extruder and stable extrusion cannot sometimes be conducted probably owing to liquid substances oozing out on the pellet surface. Accordingly, a method comprising continually adding (B) to (A) during melting of (A) in the extruder, directly molding the resultant composition by a die or the like and then moving onto the next step is preferable. Further, a twin screw extruder is suitable for mixing the resin and the additive uniformly because it is superior to a single screw extruder in carrying and mixing the resin.

In the multilayer structure, the layer of resin composition (C) is used as at least one of surface layers, and may be supplied to a die or the like by using, for instance, an extruder appropriate to each layer and a junction part of each layer, or joined directly in the shape of a layer in a die having a layer junction part for the purpose of melt extrusion of other layers.

The resin composition (C) extruded in the prescribed shape by T die or circular slit die is quickly cooled down to the extent in which crystal does not grow according to such a method that comprises soaking in cold water and contacting with a cooled casting roll. For instance, the temperature of casting roll or the like for quick cooling is 25° C. or less in the system wherein 20 parts by mass of acetylated monoglyceride is added to 100 parts by mass of polylactic acid resin (in the case where the resin is a copolymer of L-body and D-body and contains D-body in a content of 4% by mass). This temperature is decided referring to the glass transition temperature of resin composition (C) or the like so that the surface roughness of the film obtained can be within the range of the present invention and crystal growth can be prevented as described above. When the cooling temperature is high, crystals tend to grow and cause tearing or splitting in the following stretching step to make stretching difficult, and also the surface roughness of the obtained film tends to deviate from the range of the present invention, which may be the result of crystal growth, but this is not clear.

The stretching step is conducted by methods such as a tubular stretching method and a sequential biaxial stretching method, and the longitudinal and traverse stretching ratio, longitudinal/traverse, is preferably 1.0 or less to keep the cutting ability of the blade attached to a dispenser box excellent. When the longitudinal and traverse stretching ratio is 1.0 or less, the film is difficult to tear in the direction differing from intended, for instance, slantwise or vertically to the cutting direction, upon cutting. This is probably because the influence by orientation in the longitudinal direction is unlikely to appear. Further, the stretching temperature is higher than a glass transition temperature of resin composition (C) and lower than the crystallization peak temperature appearing at the time of rising temperature in DSC. Within this temperature range, too rough of a surface or the deterioration of the surface roughness caused by stretching at insufficient temperatures is unlikely to happen, and tearing and splitting caused by too high temperatures is also unlikely to happen.

In the sequential biaxial stretching method wherein the film is stretched in the longitudinal direction by a roll type longitudinal stretcher and then introduced to the traverse stretching step, it is preferred to cool the film to the temperature below the glass transition temperature immediately after the longitudinal stretching from the viewpoint of restraining the occurrence of longitudinal splitting at the following step of traverse stretching due to crystallization along the longitudinal orientation by longitudinal stretching and surface roughness of the film.

It is preferred to continually convey the stretched film to the heat treatment step to heat for 5 to 15 seconds at a temperature within the range of from the melting point of resin composition (C) to a temperature which is lower than melting point by 40° C. Heating the film under this specific condition is preferred in order to facilitate and accelerate stretching oriented crystallization in the stretching step to some extent. The acceleration of the crystallization restrains change of physical properties, controls the cling energy, pulling-out force, tensile modulus and surface roughness to the range necessary in the present invention, and improves blocking resistance. The heat treatment under the abovementioned conditions is preferable in that, particularly, blocking can be prevented less or no blocking inhibitor or crystal nucleating agent of inorganic substance powder.

When the heating is insufficient, for instance, the heating time is shorter or heating temperature is lower compared to the above-described range in the above-described heat treatment step, the physical properties are not fixed in the significant range and change easily after the production. This is probably because of an increase in the crystallinity which progresses extremely gradually even after the heat treatment step. Particularly, the insufficient heating induces tightening of the winding after winding on a core such as a paper tube, deteriorates pulling-out property, and, in the worse case, causes blocking owing to tight winding of the film and makes it difficult to pull-out the film. The film having deteriorated pulling-out property, namely having an enormously large pulling-out force, results in the need to forcibly peel-off the sticking parts of the blocked films which may destroy the parts. The film pulled out under such a condition is likely to have surface roughness deviating from the range of the present invention. As a result, the cling energy force easily deviates from the range of the present invention. In addition, there are some tendencies toward lacking heat resistance probably owing to insufficient crystal generation.

Although the above heat treatment step is advantageous in preventing blocking at the time of excessive heating such as longer heating time and higher heating temperature compared to the above-described range, cling energy tends to decrease and deviate from the necessary range of the present invention. In some cases, films are torn and split so that stable production of a film cannot be conducted. Although there is a case where neither tearing nor splitting occurs even if the heating is prolonged at a temperature which is lower than the melting point by 40° C. or more, the film obtained under such a condition is poor in dimensional stability and easy to shrink to open holes or tear when it is exposed to a high temperature, for instance, at the time of heating in a microwave oven.

This heat treatment step also influences the surface roughness. For instance, without the heat treatment, the film having a surface roughness within the range of the present invention is sometimes difficult to be obtained. The heat treatment step is considered to have an effect of homogenizing the ruggedness of the film surface to some extent, i.e., leveling the ruggedness. However, when the heat treatment is conducted for a long time, the surface roughness sometimes deviates from the range of the present invention probably owing to the generation of bulky crystals.

Further, in this heat treatment step, there is no particular limitation on the operation for easing stress in both longitudinal and traverse directions within the range suitable to the shrinkage stress of the film at the time of heating. In practice, this operation for easing stress is preferably conducted by fixing the film width to a slightly narrower width than a film width just after stretching (e.g., fixing both film ends to a narrower width than width of film after stretching in the heating zone of a tenter for heat treatment). When the operation for easing stress is set beyond the range of shrinkage stress of the film, the film does not sufficiently shrink in some cases so that not only is the surface roughness within the range of the present invention difficult to obtain, but also there is uneven thickness and a deterioration in the physical properties occur so an excellent film is difficult to obtain.

After the heat treatment step, the film is taken-up in a roll shape by a winder or the like so as not to be wrinkled. Since the crystallization of the film progresses in the heat treatment step, taking-up of the film while the crystallization is progressing sometimes causes blocking and adhesion of films. In this state, pulling-out force and cling energy can deviate from the range of the present invention as described above, and therefore it is preferable to cool the film to prevent the adhesion of films. The cooling is generally conducted by exposing a film to air flow at around room temperature, but it is preferred to take-up a film continuously after cooling the film sufficiently with a cold wind preferably at a glass transition temperature or less. By this process, the film can be taken-up in the state that the crystallization is almost stopped or considerably moderated and the adhesion such as blocking in the taken-up film roll can be prevented.

The resultant film is slit into pieces with a desirable width and wound around a core such as a paper tube with desirable length to provide a film roll. This is placed in a dispenser box to obtain a wrap product.

The film of the present invention is excellent in the balance between a clinging property and a pulling-out property and is easy-to-use as a wrap film. Further, the film of the present invention has all properties excellent as a wrap film, e.g., heat resistance, cutting property, flexibility demonstrating shape following property for an article to be wrapped, transparency, and feeling to the touch. Further, it is possible to make the entire wrap product biodegradable by using a blade made of plant derivative-resin as a cutting blade attached to the dispenser box having the film placed therein.

EXAMPLES

Hereinafter, the examples and comparative examples of the present invention are explained. The measurement methods and evaluation items are explained below and also summarized in Table 1. In addition, compositions and main production conditions in Examples and Comparative Examples and the measurement results are summarized in Tables 2 to 6 and Tables 7 and 8, respectively.

(1) Surface Roughness

The surface roughness of the present invention is measured by observing the shape of film surface with Nano Scope IIIa atomic force microscope (usually abbreviated as AFM) manufactured and sold by Digital Instruments Company at a tapping mode. The observation conditions are: cantilever NCH (spring constant: 0.07–0.58 N/m), Scanrate of 1 Hz, observation view angle of 2 μm, and Scanline of 256×256 and 512×512. The obtained observation image is amended in curve and inclination, and arithmetic average line roughness Ra, which is obtained at 5 points in each of X and Y directions at an average observed face area without uneven parts having apparent scratches or surface adhesion materials, is decided as roughness of the surface. The similar measurement is conducted in other observed face areas and average values of the five observed face areas in total are adopted as surface roughness. The thus-obtained surface roughness is a parameter showing surface smoothness of the film. The smaller the surface roughness value, the more excellent the surface smoothness. As summarized in Table 1, the surface roughness of not less than 0.5 nm but not more than 2.5 nm is defined as ⊙, the surface roughness of more than 2.5 nm but not more than 4 nm is defined as ○, and the surface roughness of more than 4 nm is defined as x.

(2) Tensile Modulus

The tensile modulus is measured by the method in accordance with ASTM-D882. The stress upon 2% elongation in the flow direction at the extrusion of film in terms of film thickness is calculated and an average of five samples is adopted. The tensile modulus is an index to flexibility. The lower the value, the more flexible the film. As summarized in Table 1, a film having the tensile modulus of 500 to 1000 MPa is defined as ⊙ because of its excellent feeling to the touch, cutting property and shape following property for the article to be wrapped, a film having the tensile modulus of not less than 400 MPa but less than 500 MPa and a film having tensile modulus of more than 1,000 but not more than 1,500 MPa are defined as ○, and other ranges are defined as x because of poor feeling to the touch, cutting property, shape following property for the article to be wrapped, clinging property and pulling-out property.

(3) Heat Resistance

According to Tokyo Consumer Life Ordinance, Article 11, 5 samples in each the parallel direction and vertical width direction to the flow direction at the extrusion of film are prepared and the highest temperature at which the film is not cut under loading of 10 g for 1 hour is considered as a heat resistant temperature. As summarized in Table 1, a film having the heat resistant temperature of not less than 140° C. is defined as most excellent, ⊙, a film having the resistant temperature of not less than 130° C. but less than 140° C. is defined as ○, and a film having the resistant temperature of less than 130° C. and lack in heat resistance is defined as x.

(4) Cling Energy (Clinging Property)

The cling energy is measured by the following method. First, two cylindrical measurement jigs with a bottom area of 25 cm$^2$ and having filter paper adhered to the entire bottom surface are prepared. A film covers the bottom surface so as not to crinkle and is fixed under tension. Next, the cylindrical measurement jigs are fitted vertically so that their film surfaces adhere to each other and a weight of 500 g is put on the upper jig to apply load to the adhered film surface for 1 minute. Then, the weight is removed quietly, and the energy generating while separating the films in the vertical direction to the adhered surface by using a tensile tester at a tensile rate of 5 mm/min is defined as a cling energy. The measurement is conducted at constant temperature of 23° C. and under constant moisture of 50%. The measurement is conducted ten times and the average of the resultants is adopted. This cling energy is an index to clinging property, and for measurement of the power that films cling to each other or to earthenware or glassware. The higher the value, the higher the clinging power. As summarized in Table 1, the range of cling energy not less than 0.7 mJ but not more than 2.2 mJ showing an excellent clinging property and contributing to ease of use is defined as ⊙, the range not less than 0.5 mJ but less than 0.7 mJ and the range more than 2.2 mJ but not more than 2.5 mJ is defined as ○, and other ranges in which a film tends to be difficult to use for poor or excessive clinging are defined as x.

(5) Pulling-Out Force (Pulling-Out Property)

The pulling-out force is measured by the following method. A wrap film roll prepared by winding a 30 cm wide film around a paper tube is set to a roll jig that easily rotates with very little power and the end of the film is fixed on a 330 cm wide jig which directly connects to a load cell of the tensile tester. Then, the average stress generated while the film is pulled out at a rate of 1,000 mm/min is measured. The measurement is conducted at constant temperature of 23° C. and under constant moisture of 50%. This measurement is conducted ten times and the average of the resultants is adopted.

The pulling-out force is an index to pulling-out property. The lower the value, the lighter the power for pulling-out film. As summarized in Table 1, the most preferred range of pulling-out force of 8 cN to 80 cN is defined as ⊙, the range of not less than 5 cN but less than 8 cN and the range of more than 80 cN but not more than 100 cN are defined as ○, and other ranges in which a film is difficult to pull out for too light or too high pulling-out force are defined as x.

(6) Feeling to the Touch

A hundred housewives who use wrap films daily are randomly chosen to touch the film. The case where the number of people answering that feeling to the touch is good is not less than 90 is defined as ⊙, the case where the number is not less than 75 but less than 90 is defined as ○, and the case where the number is less than 75 is defined as x.

(7) Transparency

In accordance with the method described in ASTM-D-103, Haze of the resultant film is measured by using NDH-300A manufactured by Nippon Denshoku Industries Co., Ltd. The measurement value of less than 1.0 is defined as ⊙, the measurement value of not less than 1.0 but less than 2.5 is defined as ○, and the measurement value of not less than 2.5 is defined as x.

Example 1

When, as aliphatic polyester resin (A), 100 parts by mass of crystalline polylactic acid resin (melting point: about 150° C.), a copolymer of lactic acid monomers L-body and D-body with a D-body content of 4% by mass, "Natureworks" (trade name) manufactured and sold by Cargill Dow LLC, was melt extruded by using a complete intermeshing corotating twin screw extruder, parts by mass of "Rikemal PL019" (trade name, acetylated monoglyceride) manufactured and sold by Riken Vitamin Co., Ltd. was injected as liquid additive (B) from a liquid injection part arranged on the cylinder of the extruder by using a constant quantity liquid sending pump. These components were well melt kneaded at about 190° C., a resin temperature in the kneading area of the extruder, and then extruded in the sheet shape as resin composition (C) from T die arranged on the tip of the extruder. At this time, a gap width of a die lip arranged in the molten resin outlet part of T die or the like was controlled so as to make the thickness of the final film 8 μm considering the production condition that influences film thickness, e.g., stretching ratio and rotating rate of cast roll in the following step.

Then, the extruded sheet was introduced on the cast roll with a mirror-finished flat surface having a surface temperature of 15° C. and arranged so that the roll surface located within 3 mm from the die lip of T die is cooled quickly by making the extruded sheet contact the roll surface uniformly. Herein, depending on the relation of rotating rate, extrusion rate, extrusion quantity and the like, the width of the extruded sheet on the roll can be narrower than the die lip owing to neck-in phenomenon. In this example, roll rate, extrusion quantity, distance between T die lip and roll or the like was controlled so as to extrude a sheet with the largest width stably.

The well-cooled extruded sheet was introduced to a roll type longitudinal stretching machine. The surface temperature of the roll in the stretching zone was 50° C. The sheet was stretched in the longitudinal direction to be 2.5 times utilizing difference between rotating rates of the rolls in the upstream and the downstream. The longitudinally stretched film was immediately introduced to a cooling roll having a surface temperature of 15° C. and cooled down to the temperature lower than the glass transition temperature promptly.

After that, the stretched film was introduced to a tenter type transverse stretching machine and stretched in the transverse direction to be 5 times at a stretching temperature of 55° C., and subsequently introduced to a heat treatment step. The heat treatment step comprised letting the film stressed in the longitudinal and transverse directions pass through a zone having an atmosphere temperature of 130 to 135° C. over about 8 seconds. This treatment facilitated crystalline orientation by stretching and raised the crystallinity of the film to enable prevention of tight winding after being taken-up, blocking, stabilization of physical properties, and control of the final surface roughness in the film forming step. The film after the heat treatment step was subsequently taken-up by a winder while cooling by blowing cold air having a temperature of 15° C. to obtain a film. The resultant film had a thickness of 8 μm. This film was slit into a film of 30 cm wide, wound around a paper tube for a home wrap film, and then placed in a dispenser box equipped with a blade for cutting the film to provide a wrap product.

When this wrap film was evaluated for surface roughness, tensile modulus, heat resistant temperature, cling energy, pulling-out force, feeling to the touch and transparency, excellent results were obtained as shown in Table 7.

Example 2

A wrap product was obtained in the same manner as in Example 1 except that a mixture of 25 parts by mass of "Rikemal PL019" and 3 parts by mass of "Newsizer 510R" (trade name, epoxidized soybean oil), manufactured and sold by NOF Corp., was used as liquid additive (B) based on 100 parts by mass of aliphatic polyester resin (A). When the similar evaluation to Example 1 was conducted on this wrap film, excellent results were obtained as shown in Table 7.

Example 3

A wrap product was obtained in the same manner as in Example 2 except that a mixture of 93.5% by mass of crystalline polylactic acid resin (D-body content: 4% by mass, melting point: about 150° C.), "Natureworks" (trade name) manufactured and sold by Cargill Dow LLC, and 6.5% by mass of "Ecoflex" (trade name, polybutylene adipate-butylene terephthalate copolymer resin), manufactured and sold by BASF AG, was used as aliphatic polyester resin (A). When the similar evaluation to Example 1 was conducted on this wrap film, excellent results were obtained as shown in Table 7.

Example 4

A wrap product was obtained in the same manner as in Example 2 except that a mixture of 90% by mass of crystalline polylactic acid resin (D-body content: 4% by mass; melting point: about 150° C.), "Natureworks" (trade name) manufactured and sold by Cargill Dow LLC, 5% by mass of non-crystalline polylactic acid resin (D-body content: 13% by mass) and 5% by mass of "Ecoflex" (trade name, poly butylene adipate-butylene terephthalate copolymer resin), manufactured and sold by BASF AG, was used as aliphatic polyester resin (A). When the similar evaluation to Example 1 was conducted on this wrap film, excellent results were obtained as shown in Table 7.

Example 5

A wrap product was obtained in the same manner as in Example 2 except that a mixture of 97.5% by mass of crystalline polylactic acid resin (D-body content: 4% by mass; melting point: about 150° C.), "Natureworks" (trade name) manufactured and sold by Cargill Dow LLC, and 2.5% by mass of "Celgreen" (trade name, polycaprolactone resin), manufactured and sold by Daicel Chemical Industries, Ltd., was used as aliphatic polyester resin (A) and a mixture of 22.5 parts by mass of "Rikemal PL019" (trade name) and 2.5 parts by mass of "Newsizer 510R" (trade name) was used as liquid additive (B). When the similar evaluation to Example 1 was conducted on this wrap film, excellent results were obtained as shown in Table 7.

Example 6

A wrap product was obtained in the same manner as in Example 1 except that a mixture of 90% by mass of crystalline polylactic acid resin (D-body content: 8% by mass; melting point: about 130° C.) and 10% by mass of "Bionore #3001" (trade name, polybutylene succinate adipate resin), manufactured and sold by Showa Highpolymer Co., Ltd., was used as aliphatic polyester resin (A), 5 parts by mass of "Rikemal PL019" (trade name) was used as liquid additive (B), and the time for passing the atmosphere of 130 to 135° C. at the heat treatment step in the production process was 15 seconds. When the similar evaluation to Example 1 was conducted on this wrap film, excellent results were obtained as shown in Table 7.

Example 7

A wrap product was obtained in the same manner as in Example 6 except that a mixture of 90% by mass of crystalline polylactic acid resin (D-body content: 8% by mass; melting point: about 130° C.) and 10% by mass of "Ecoflex" (trade name, polybutylene adipate-butylene-terephthalate copolymer resin), manufactured and sold by BASF AG, was used as aliphatic polyester resin (A) and a mixture of 15 parts by mass of "Rikemal PL019" (trade name) and 2.5 parts by mass of "Newsizer 510R" (trade name) was used as liquid additive (B). When the similar evaluation to Example 1 was conducted on this wrap film, excellent results were obtained as shown in Table 7.

Example 8

A wrap product was obtained in the same manner as in Example 1 except that crystalline polylactic acid resin having a D-body content of 3% by mass (melting point: about 155° C.) was used as aliphatic polyester resin (A) and a mixture of 35 parts by mass of "Rikemal PL019" (trade name) and 5 parts by mass of "Newsizer 510R" (trade name) was used as liquid additive (B) based on 100 parts by mass of aliphatic polyester resin (A). When the similar evaluation to Example 1 was conducted on this wrap film, excellent results were obtained as shown in Table 7.

Example 9

A wrap product was obtained in the same manner as in Example 3 except that the stretching ratios in the longitudinal and transverse directions at the stretching step in the production process were changed to 2.0 times and 6.0 times, respectively. When the similar evaluation to Example 1 was conducted to this wrap film, excellent results were obtained as shown in Table 7.

Example 10

A wrap product was obtained in the same manner as in Example 3 except that the stretching ratios in the longitudinal and transverse directions at the stretching step in the production steps were changed to 3.7 times and 3.7 times, respectively. When the similar evaluation to Example 1 was conducted on this wrap film, excellent results were obtained as shown in Table 7.

Example 11

A wrap product was obtained in the same manner as in Example 1 except that a mixture of 95% by mass of crystalline polylactic acid resin (D-body content: 2.5% by mass; melting point: about 158° C.) and 5% by mass of "Ecoflex" (trade name) was used as aliphatic polyester resin (A), a mixture of 25 parts by mass of "Rikemal PL019" (trade name) and 5 parts by mass of "Newsizer 510R" (trade name) was used as liquid additive (B) based on 100 parts by mass of aliphatic polyester resin (A), and the time for passing the atmosphere of 130 to 135° C. at the heat treatment step in the production process was 5 seconds. When the similar evaluation to Example 1 was conducted on this wrap film, excellent results were obtained as shown in Table 7.

Example 12

The twin screw extruder for extruding resin composition (C) was used for both surface layers of the multilayer film. In parallel, using another twin screw extruder for inner layer, 100 parts by mass of crystalline polylactic acid resin (D-body content: 4% by mass), "Natureworks" (trade name) manufactured and sold by Cargill Dow LLC, and 15 parts by mass of "Rikemal PL019" (trade name) were well kneaded. Then, compositions in the molten state from the both extruders were laminated using a layer forming part and extruded from a T die. At this time, thickness ratio of each layer was 4/2/4 assuming the overall layer as 10, and the ratio of the layer comprising (C) to the overall layer was 80%. A wrap product was obtained under the same production conditions as in Example 3 other than the above mentioned. When the similar evaluation to Example 1 was conducted on this wrap film, excellent results were obtained as shown in Table 7.

Example 13

A wrap product was obtained in the same manner as in Example 12 except that the resin composition to be supplied to the extruder for the inner layer was changed to a mixture prepared by incorporating 25 parts by mass of "Rikemal PL019" (trade name) into 100 parts by mass of a mixture comprising 90% by mass of crystalline polylactic acid resin (D-body content: 4% by mass), "Natureworks" (trade name) manufactured and sold by Cargill Dow LLC, and 10% by mass of "Ecoflex" (trade name). The similar evaluation to Example 1 was conducted on this wrap film and an excellent result was obtained as shown in Table 7.

Example 14

A wrap product was obtained in the same manner as in Example 12 except that the resin composition to be supplied to the extruder for inner layer was changed to a mixture prepared by incorporating 25 parts by mass of "Rikemal PL019 " (trade name) and 3 parts by mass of "Newsizer 510R" (trade name) into 100 parts by mass of a mixture comprising 90% by mass of crystalline polylactic acid resin (D-body content: 4% by mass), "Natureworks" (trade name) manufactured and sold by Cargill Dow LLC, 5% by mass of non-crystalline polylactic acid resin (D-body content: 13% by mass) and 5% by mass of "Ecoflex" (trade name). The similar evaluation to Example 1 was conducted on this wrap film and an excellent result was obtained as shown in Table 7.

Example 15

The twin screw extruder for extruding resin composition (C) was used for both surface layers in the multilayer film. In parallel, using another twin screw extruder for the inner layer, 100 parts by mass of mixture of 90% by mass of crystalline polylactic acid resin (D-body content: 4% by mass), "Natureworks" (trade name) manufactured and sold by Cargill Dow LLC, and 10% by mass of "Ecoflex" (trade name), was well kneaded with 35 parts by mass of "Rikemal PL019" (trade name) and 5 parts by mass of "Newsizer 510R" (trade name). The compositions in the molten state from the both extruders were laminated using a layer forming part and extruded from T die. At this time, thickness ratio of each layer was 1/8/1 assuming the overall layer as 10 and the ratio of the layer comprising (C) to the overall layer was 20%. A wrap product was obtained under the same production conditions as in Example 3 other than the above mentioned. When the similar evaluation to Example 1 was conducted on this wrap film, excellent results were obtained as shown in Table 7.

Example 16

Aliphatic polyester resin (A) and liquid additive (B) used in Example 3 was well melt kneaded by a complete intermeshing corotating twin screw extruder equipped with a liquid injection part (same as used in Example 1) at about 190° C., a resin temperature in the kneading area of the extruder, and then extruded in the form of cylindrical molten parison of resin composition (C) from a circular slit die arranged on the tip of the extruder. At this time, a gap width of the slit part of the circular slit die was decided so as to make the thickness of the final film 8 μm considering the production condition that influences film thickness, e.g., stretching ratio in the following step and taken-up rate by cold water in the cooling step.

The cylindrical molten parison was passed through a water cooling ring arranged close to the slit die to quickly cool by cooling water at 20° C. discharged from the ring, and take-up. At this time, the taken-up rate was controlled so as to stably produce parison with the largest diameter.

The well-cooled parison was introduced to an inflation bubble stretching step. The stretching temperature at this time was 60° C. Stretching ratio in the longitudinal direction was calculated from the ratio of parison flow rate in the upper stream than bubble forming area to stretched film flow rate in the downstream than the bubble forming area, and the stretching ratio herein was 2.5 times. Stretching ratio in the transverse direction was calculated from the ratio of parison width in the upper stream than the bubble forming area to stretched film width lo in the downstream than the bubble forming area, and the stretching ratio herein was 5.0 times. The bubble was deflated by a deflator to be a two-ply sheet. At this time, the bubble was cooled with cold air at 20° C. to prevent the two layers from sticking to each other owing to blocking or the like caused by progress of crystallinity. Then, the deflated bubble was cut at the both ends in the width direction to separate the two layers.

The resultant stretched film was introduced to the heat treatment step. This step comprised letting the film under stress in the longitudinal and transverse directions pass through a zone having an atmosphere temperature of 130 to 135° C. over about 8 seconds. This treatment facilitated crystalline orientation by stretching and raised the crystallinity of the film to enable stabilization of physical properties. The film after the heat treatment step was subsequently taken-up by a winder while cooling by blowing cold air having a temperature of 15° C. The resultant film had a thickness of 8 μm. This film was slit into a film of 30 cm wide, wound around a paper tube for a home wrap film and then placed in a dispenser box equipped with a blade for cutting the film to provide a wrap product. When this wrap film was evaluated for surface roughness, tensile modulus, heat resistance temperature, cling energy, pulling-out force, feeling to the touch and transparency, excellent results were obtained as shown in Table 7.

Example 17

In Example 16, the twin screw extruder extruding resin composition (C) was used for both surface layers in the multilayer film, and in parallel, using another twin screw extruder, a mixture prepared by incorporating 25 parts by mass of "Rikemal PL019" (trade name) into 100 parts by mass of a mixture of 90% by mass of crystalline polylactic acid resin (D-body content: 4% by mass), "Natureworks" (trade name) manufactured and sold by Cargill Dow LLC, and 10% by mass of "Ecoflex" (trade name) were well kneaded. The compositions in the molten state from the both extruders were laminated by a layer forming part and extruded from circular slit die. At this time, the thickness ratio of each layer was 4/2/4 assuming the overall layer as 10 and the ratio of the layer comprising (C) to the overall layer was 80%. A wrap product was obtained under the same production conditions as in Example 16 other than the above mentioned. When the similar evaluation to Example 1 was conducted on this wrap film, excellent results were obtained as shown in Table 7.

Comparative Example 1

A wrap film wound around a paper tube and placed in a dispenser box was obtained in the same manner as in Example 1 except that a mixture of 90% by mass of crystalline polylactic acid resin (D-body content: 4% by mass; melting point: about 150° C.), "Natureworks" (trade name) manufactured and sold by Cargill Dow LLC, and 10% by mass of "Ecoflex" (trade name, polybutylene adipate-butylene terephthalate copolymer resin), manufactured and sold by BASF AG, was used as aliphatic polyester resin (A) and 3 parts by mass of "Rikemal PL019" (trade name) was used as liquid additive (B). When the similar evaluation to Example 1 was conducted to this wrap film, excellent results were not obtained as shown in Table 8.

Comparative Example 2

A wrap film wound around a paper tube and placed in a dispenser box was obtained in the same manner as in Example 7 except that the amount of "Rikemal PL019" (trade name) used as liquid additive (B) was 3 parts by mass based on 100 parts by mass of aliphatic polyester resin (A) and "Newsizer 510R" was not used. When the similar evaluation to Example 1 was conducted on this wrap film, excellent results were not obtained as shown in Table 8.

Comparative Example 3

A wrap film wound around a paper tube and placed in a dispenser box was obtained in the same manner as in Example 8 except that a mixture of 40 parts by mass of "Rikemal PL019" (trade name) and 5 parts by mass of "Newsizer 510R" (trade name) based on 100 parts by mass of aliphatic polyester resin (A) was used as liquid additive (B). When the similar evaluation to Example 1 was conducted on this wrap film, excellent results were not obtained as shown in Table 8.

Comparative Example 4

Using the similar aliphatic polyester resin (A) and liquid additive (B) to Example 16, extrusion from a circular slit die was conducted in the same manner as in Example 16 to obtain tubular molten parison. The resultant tubular molten parison was cooled while expanding in the molten or half molten state by blowing air directly thereinto, and formed into a film. The expansion ratio, the ratio of parison diameter before expansion to film diameter after expansion, was 5.0 and film thickness at this time was 8 μm. The atmosphere temperature in the zone where the expansion ratio was 5.0 was 30° C. After deflating the expanded tubular film by a deflator, the resultant two-ply sheet was cut at both ends in the width direction to separate and take-up by a winder or the like. The resultant film had a thickness of 8 μm. Then, a wrap film wound around a paper tube and placed in a dispenser box was obtained in the same manner as in Example 16. When the similar evaluation to Example 1 was conducted on this wrap film, it was impossible to pull out the film wound around the paper tube probably owing to blocking or tight winding so that the measurement could not be conducted.

Comparative Example 5

After the expanded two-ply film obtained in Comparative Example 4 was separated, the film was introduced to the heat treatment step wherein the atmosphere temperature was 120° C. and the time for passing was 15 seconds under tension to the degree that the film was not loosened both in the longitudinal and transverse directions. The film after the heat treatment step was cooled by blowing cold air at 15° C. and taken-up with a winder. The film obtained had a thickness of 8 μm. The following process was conducted in the same manner as in Comparative Example 4 to obtain a wrap film wound around a paper tube and placed in a dispenser box. When the similar evaluation to Example 1 was conducted on this wrap film, cling energy was within the range of the present invention as shown in Table 8. However, surface roughness, tensile modulus and heat resistant temperature deviated the ranges of the present invention. Excellent results were not obtained except for cling property and transparency.

TABLE 1

| Evaluation Item [unit] | ⊚ | ○ | x |
|---|---|---|---|
| Surface roughness [nm] | 0.5 to 2.5 | more than 2.5 but 4.0 or less | more than 4.0 |
| Tensile modulus [MPa] | 500 to 1000 | 400 or more but less than 500 more than 1000 but 1500 or less | Ranges other than mentioned |
| Heat resistant temperature [° C.] | 140 or more | 130 or more but less than 140 | less than 130 |
| Cling energy [mJ] | 0.7 to 2.2 | 0.5 or more but less than 0.7 more than 2.2 but 2.5 or less | Ranges other than mentioned |
| Pulling-out force [cN] | 8 to 80 | more than 5 but less than 8 80 or more but less than 100 | Ranges other than mentioned |
| Feeling to the touch [no. of person] | 90 or more | 75 or more but less than 90 | less than 75 |
| Transparency (HAZE) [%] | 1.5 or less | more than 1.5 but 3.0 or less | more than 3.0 |

TABLE 2

| | Layer of resin composition (C) | | | | Method for | | | |
|---|---|---|---|---|---|---|---|---|
| | Aliphatic polyester resin (A) (part by mass) | Liquid additive (B) (part by mass) | Inner layer | Production method | cooling molten resin and temperature thereof | Stretching ratio longitudinal × traverse | Stretching ratio longitudinal/ traverse | Heat treatment condition temp [° C.] × time [sec] |
| Ex. 1 | D4PLA (100) | PL019 (25) | None (single layer) | T-die sequential biaxial stretching | 15° C. cast roll | 2.5 × 5.0 | 0.5 | (130–135) × 8 |
| Ex. 2 | " | PL019 (25) ESO (3) | None (single layer) | T-die sequential biaxial stretching | " | " | " | " |
| Ex. 3 | D4PLA (93.5) Ecoflex (6.5) | PL019 (25) ESO (3) | None (single layer) | T-die sequential biaxial stretching | " | " | " | " |

TABLE 2-continued

| | Layer of resin composition (C) | | | | Method for | | | |
|---|---|---|---|---|---|---|---|---|
| | Aliphatic polyester resin (A) (part by mass) | Liquid additive (B) (part by mass) | Inner layer | Production method | cooling molten resin and temperature thereof | Stretching ratio longitudinal × traverse | Stretching ratio longitudinal/ traverse | Heat treatment condition temp [° C.] × time [sec] |
| Ex. 4 | D4PLA (90) D13PLA (5) Ecoflex (5) | PL019 (25) ESO (3) | None (single layer) | T-die sequential biaxial stretching | " | " | " | " |
| Ex. 5 | D4PLA (97.5) PH7 (2.5) | PL019 (22.5) ESO (2.5) | None (single layer) | T-die sequential biaxial stretching | " | " | " | " |

Note:
DnPLA (wherein n represents a numeral): polyactic acid resin having D-body content of n % by mass
Ecoflex: "Ecoflex"
PH7: "Celgreen PH7"
3001: "Bionore #3001"
PL019: "Rikemal PL019"
ESO: "Newsizer 510R"

TABLE 3

| | Layer of resin composition (C) | | | | Method for | | | |
|---|---|---|---|---|---|---|---|---|
| | Aliphatic polyester resin (A) (part by mass) | Liquid additive (B) (part by mass) | Inner layer | Production method | cooling molten resin and temperature thereof | Stretching ratio longitudinal × traverse | Stretching ratio longitudinal/ traverse | Heat treatment condition temp [° C.] × time [sec] |
| Ex. 6 | D8PLA (90) #3001 (10) | PL019 (5) | None (single layer) | T-die sequential biaxial stretching | 15° C. cast roll | 2.5 × 5.0 | 0.5 | (130–135) × 15 |
| Ex. 7 | D8PLA (90) Ecoflex (10) | PL019 (15) ESO (2.5) | None (single layer) | T-die sequential biaxial stretching | " | " | " | " |
| Ex. 8 | D3PLA (100) | PL019 (35) ESO (5) | None (single layer) | T-die sequential biaxial stretching | " | " | " | (130–135) × 8 |
| Ex. 9 | D4PLA (93.5) Ecoflex (6.5) | PL019 (25) ESO (3) | None (single layer) | T-die sequential biaxial stretching | " | 2.0 × 6.0 | 0.33 | " |
| Ex. 10 | D4PLA (93.5) Ecoflex (6.5) | PL019 (25) ESO (3) | None (single layer) | T-die sequential biaxial stretching | " | 3.7 × 3.7 | 1.0 | " |
| Ex. 11 | D2.5PLA (95) Ecoflex (5) | PL019 (25) ESO (3) | None (single layer) | T-die sequential biaxial stretching | " | 2.5 × 5.0 | 0.5 | (130–135) × 15 |

Note:
DnPLA (wherein n represents a numeral): polyactic acid resin having D-body content of n % by mass
Ecoflex: "Ecoflex"
PH7: "Celgreen PH7"
3001: "Bionore #3001"
PL019: "Rikemal PL019"
ESO: "Newsizer 510R"

TABLE 4

| | Layer of resin composition (C) | | | | Method for cooling | | | |
|---|---|---|---|---|---|---|---|---|
| | Aliphatic polyester resin (A) (part by mass) | Liquid additive (B) (part by mass) | Composition of inner layer (part by mass) | Production method | molten resin and temperature thereof | Stretching ratio longitudinal × traverse | Stretching ratio longitudinal/ traverse | Heat treatment condition temp [° C.] × time [sec] |
| Ex. 12 | D4PLA (93.5) Ecoflex (6.5) | PL019 (25) ESO (3) | D4PLA (100) PL019 (15) | multilayer sequential biaxial stretching surface layer/inner layer/surface layer = 4/2/4 | 15° C. cast roll | 2.5 × 5.0 | 0.5 | (130–135) × 8 |
| Ex. 13 | D4PLA (93.5) Ecoflex (6.5) | PL019 (25) ESO (3) | D4PLA 90% + Ecoflex 10% (100) PL019 (25) | multilayer sequential biaxial stretching surface layer/inner layer/surface layer = 4/2/4 | " | " | " | " |
| Ex. 14 | D4PLA (93.5) Ecoflex (6.5) | PL019 (25) ESO (3) | D4PLA 90% + D13PLA 5% + Ecoflex 5% (100) PL019 (25) ESO (3) | multilayer sequential biaxial stretching surface layer/inner layer/surface layer = 4/2/4 | " | " | " | " |

Note:
DnPLA (wherein n represents a numeral): polyactic acid resin having D-body content of n % by mass
Ecoflex: "Ecoflex"
PH7: "Celgreen PH7"
3001: "Bionore #3001"
PL019: "Rikemal PL019"
ESO: "Newsizer 510R"
% of inner layer: % by mass

TABLE 5

| | Layer of resin composition (C) | | | | Method for cooling | | | |
|---|---|---|---|---|---|---|---|---|
| | Aliphatic polyester resin (A) (part by mass) | Liquid additive (B) (part by mass) | Composition of inner layer (part by mass) | Production method | molten resin and temperature thereof | Stretching ratio longitudinal × traverse | Stretching ratio longitudinal/ traverse | Heat treatment condition temp [° C.] × time [sec] |
| Ex. 15 | D4PLA (93.5) Ecoflex (6.5) | PL019 (25) ESO (3) | D4PLA 90% + Ecoflex 10% (100) PL019 (35) ESO (5) | multilayer T-die sequential biaxial stretching surface layer/inner layer/surface layer = 1/8/1 | 15° C. cast roll | 2.5 × 5.0 | 0.5 | (130–135) × 8 |
| Ex. 16 | D4PLA (93.5) Ecoflex (6.5) | PL019 (25) ESO (3) | — | Inflation bubble stretching method | Water cooling ring using 20° C. cooling water | " | " | " |
| Ex. 17 | D4PLA (93.5) Ecoflex (6.5) | PL019 (25) ESO (3) | D4PLA 90% + Ecoflex 10% (100) PL019 (25) | multilayer Inflation bubble stretching method surface layer/inner layer/surface layer = 4/2/4 | Water cooling ring using 20° C. cooling water | " | " | " |

Note:
DnPLA (wherein n represents a numeral): polyactic acid resin having D-body content of n % by mass
Ecoflex: "Ecoflex"
PH7: "Celgreen PH7"
3001: "Bionore #3001"
PL019: "Rikemal PL019"
ESO: "Newsizer 510R"
% of inner layer: % by mass

TABLE 6

| | Layer of resin composition (C) | | | | Method for cooling | | | |
|---|---|---|---|---|---|---|---|---|
| | Aliphatic polyester resin (A) (part by mass) | Liquid additive (B) (part by mass) | Inner layer | Production method | molten resin and temperature thereof | Stretching ratio longitudinal × traverse | Stretching ratio longitudinal/ traverse | Heat treatment condition temp [° C.] × time [sec] |
| Comp. Ex. 1 | D4PLA (90) Ecoflex (10) | PL019 (3) | None (single layer) | T-die sequential biaxial stretching | 15° C. cast roll | 2.5 × 5.0 | 0.5 | (130–135) × 8 |
| Comp. Ex. 2 | D8PLA (90) Ecoflex (10) | PL019 (3) | None (single layer) | T-die sequential biaxial stretching | 15° C. cast roll | " | " | (130–135) × 15 |
| Comp. Ex. 3 | D3PLA | PL019 (40) ESO (5) | None (single layer) | T-die sequential biaxial stretching | 15° C. cast roll | " | " | (130–135) × 8 |
| Comp. Ex. 4 | D4PLA (93.5) Ecoflex (6.5) | PL019 (25) ESO (3) | None (single layer) | Inflation bubble stretching method (expansion just after extruded from die) | Air cooling | Expansion ratio: 5.0 | — | — |
| Comp. Ex. 5 | D4PLA (93.5) Ecoflex (6.5) | PL019 (25) ESO (3) | None (single layer) | Inflation bubble stretching method (expansion just after extruded from die) | " | Expansion ratio: 5.0 | — | 120 × 15 |

Note:
DnPLA (wherein n represent a numeral): polyactic acid resin having D-body content of n % by mass
Ecoflex: "Ecoflex"
PH7: "Celgreen PH7"
3001: "Bionore #3001"
PL019: "Rikemal PL019"
ESO: "Newsizer 510R"
% of inner layer: % by mass

TABLE 7

| | Surface roughness [nm] | Tensile modulus [MPa] | Heat resistant temperature [° C.] | Cling energy [mJ] | Pulling-out force [cN] | Feeling to the touch | Transparency [%] |
|---|---|---|---|---|---|---|---|
| Ex. 1 | ◉(1.0) | ○ (1300) | ◉(145) | ◉(1.0) | ◉(20) | ○ | ◉(0.2) |
| Ex. 2 | ◉(1.1) | ○ (1300) | ◉(145) | ◉(1.3) | ◉(25) | ○ | ◉(0.2) |
| Ex. 3 | ◉(2.0) | ○ (1100) | ◉(145) | ◉(1.2) | ◉(30) | ◉ | ◉(0.4) |
| Ex. 4 | ◉(2.3) | ◉(800) | ○ (135) | ◉(1.5) | ◉(30) | ◉ | ◉(0.5) |
| Ex. 5 | ○ (2.8) | ○ (1100) | ◉(145) | ◉(1.7) | ○ (85) | ○ | ◉(0.5) |
| Ex. 6 | ○ (3.3) | ○ (1300) | ○ (135) | ◉(1.2) | ○ (90) | ◉ | ○ (1.7) |
| Ex. 7 | ◉(2.3) | ◉(600) | ○ (130) | ◉(1.1) | ◉(60) | ◉ | ◉(1.0) |
| Ex. 8 | ◉(1.3) | ◉(900) | ◉(140) | ○ (0.6) | ◉(15) | ○ | ◉(0.2) |
| Ex. 9 | ◉(1.6) | ○ (1400) | ◉(145) | ◉(1.2) | ◉(25) | ◉ | ◉(0.5) |
| Ex. 10 | ◉(1.5) | ○ (1100) | ◉(145) | ◉(1.2) | ◉(25) | ◉ | ◉(0.3) |
| Ex. 11 | ◉(2.0) | ◉(900) | ◉(145) | ◉(0.8) | ◉(15) | ◉ | ◉(0.4) |
| Ex. 12 | ◉(2.0) | ○ (1300) | ◉(145) | ◉(1.0) | ◉(20) | ○ | ◉(0.4) |
| Ex. 13 | ○ (2.6) | ◉(750) | ◉(140) | ◉(1.2) | ◉(25) | ◉ | ◉(0.7) |
| Ex. 14 | ◉(2.4) | ◉(550) | ◉(140) | ◉(1.3) | ◉(30) | ◉ | ◉(0.9) |
| Ex. 15 | ○ (2.8) | ◉(500) | ○ (130) | ◉(1.1) | ◉(60) | ◉ | ○ (1.2) |
| Ex. 16 | ◉(2.1) | ◉(1000) | ◉(140) | ◉(1.2) | ◉(40) | ◉ | ◉(0.6) |
| Ex. 17 | ◉(2.3) | ◉(800) | ○ (135) | ◉(1.3) | ◉(50) | ◉ | ◉(0.8) |

TABLE 8

| | Surface roughness [nm] | Tensile modulus [MPa] | Heat resistant temperature [° C.] | Cling energy [mJ] | Pulling-out force [cN] | Feeling to the touch | Transparency [%] |
|---|---|---|---|---|---|---|---|
| Comp. Ex. 1 | ○ (3.3) | X (2000) | ◉(145) | X (0.3) | ◉(15) | X | ◉(0.7) |
| Comp. Ex. 2 | ○ (3.5) | X (1700) | ◉(140) | X (0.4) | ◉(25) | X | ◉(1.4) |
| Comp. Ex. 3 | ○ (2.7) | ○ (450) | X (125) | X (0.4) | X (105) | ○ | ◉(0.4) |
| Comp. Ex. 4 | Unable to evaluate | Unable to evaluate | Unable to evaluate | Unable to evaluate | Unable to pull out | Unable to evaluate | Unable to evaluate |
| Comp. Ex. 5 | X (4.5) | X (300) | Unable to evaluate* | ◉(0.9) | X (200) | X | ○ (1.6) |

*Evaluation could not be conducted since, because of heat, a film being loaded was considerably stretched to the level where the original shape of the film was not retained.

What is claimed is:

1. A wrap film roll comprising a core and a wrap film wound around the core, wherein a pulling-out force of the wrap film from the core of the wrap film roll is 5 to 100 cN,
wherein said wrap film has a tensile modulus of 400 to 1500 MPa, a heat resistant temperature of 130° C. or more and cling energy of 0.5 to 2.5 mJ,
wherein at least one outermost surface layer of said wrap film comprises resin composition (C), wherein resin composition (C) comprises 100 parts by mass of an aliphatic polyester resin (A) and 5 to 40 parts by mass of a liquid additive (B)
wherein said at least one outermost surface layer of said wrap film has a surface roughness of 0.5 to 4.0 nm.

2. The wrap film roll according to claim 1, wherein the aliphatic polyester resin (A) contains 90% by mass or more of polylactic acid resin comprising 8% by mass or less of D-isomer.

3. The wrap film roll according to claim 1, wherein the liquid additive (B) contains 70% by mass or more of glycerin fatty acid ester.

4. The wrap film roll according to claim 3, wherein the glycerin fatty acid ester is represented by the following formula (I):

Formula (I):

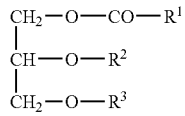

wherein $R^1$ represents alkyl group, and $R^2$ and $R^3$ represents acetyl group or hydrogen.

5. A wrap product comprising the wrap film roll according to any one of claims 1 and 3 to 4 and a box having the wrap film roll placed therein, wherein a cutter blade attached to the box is made of plant derivative-resin or paper.

6. A wrap film roll comprising a core and a wrap film wound around the core, wherein a pulling-out force of the wrap film from the core of the wrap film roll is 5 to 100 cN,
wherein said wrap film has a tensile modulus of 500 to 1500 MPa, a heat resistant temperature of 130° C. or more and cling energy of 0.5 to 2.5 mJ,
wherein at least one outermost surface layer of said wrap film comprises a resin composition (C), wherein resin composition (C) comprises 100 parts by mass of an aliphatic polyester resin (A) and 5 to 40 parts by mass of a liquid additive (B),
wherein said at least one outermost surface layer of said wrap film has a surface roughness of 0.5 to 4.0 nm,
wherein said aliphatic polyester resin (A) contains 90% by mass or more of polylactic acid resin comprising 8% by mass or less of D-isomer.

7. The wrap film roll according to claim 6, wherein the surface roughness is substantially due to crystals of the polylactic acid resin.

* * * * *